(12) United States Patent
Ivanov

(10) Patent No.: US 6,275,016 B1
(45) Date of Patent: Aug. 14, 2001

(54) BUCK-BOOST SWITCHING REGULATOR

(75) Inventor: Vadim V. Ivanov, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/784,786

(22) Filed: Feb. 15, 2001

(51) Int. Cl.$^7$ ................................................. G05F 3/16
(52) U.S. Cl. .......................................... 323/224; 323/283
(58) Field of Search .................................. 323/224, 282, 323/283, 284

(56) References Cited

U.S. PATENT DOCUMENTS

| | | | |
|---|---|---|---|
| 4,395,675 | 7/1983 | Toumani | 323/271 |
| 4,578,630 | 3/1986 | Grosch | 323/271 |
| 4,974,141 | * 11/1990 | Severinsky et al. | 323/224 |
| 5,528,125 | 6/1996 | Marshall et al. | 323/222 |
| 5,602,463 | 2/1997 | Bendall et al. | 323/266 |
| 5,734,258 | 3/1998 | Esser | 323/224 |
| 5,831,418 | 11/1998 | Kitagawa | 323/222 |

OTHER PUBLICATIONS

"Dynamic Analysis of the Switch–Mode DC/DC Converters" by Andre Kislovski et al., Van Nostrand Reinold, New York, pp. 177–203, No date.

\* cited by examiner

*Primary Examiner*—Shawn Riley
(74) *Attorney, Agent, or Firm*—W. Daniel Swayze, Jr.; W. James Brady; Frederick J. Telecky, Jr.

(57) ABSTRACT

A voltage regulator (1) and includes a first switch (S1) coupled between an input conductor (2) and a first terminal (4) of an inductor (5), a second switch (S2) coupled between the first terminal of the inductor and a common conductor (3), a third switch coupled between an output conductor (7) and a second terminal (6) of the inductor, and a fourth switch (S4) coupled between the second terminal of the inductor and the common conductor (3). The voltage regulator is operated in a mixed buck-boost mode by producing a first signal ($V_{32}$) representative of the difference between an output voltage ($V_{OUT}$) produced on the output conductor (7) by the voltage regulator and a reference voltage. A second signal ($I_{MEAS}$) is produced to represent the current through the inductor (5). A third signal ($V_{68}$) is produced to represent a combination of the first signal and the second signal. A pulse width modulated error signal (PWM) is produced by comparing the third signal ($V_{68}$) to a reference voltage. The first (S1) and fourth (S4) switches are controlled in response to the error signal (PWM) and first (Q23) and second (Q27) state signals representative of prior states of the first (S1) and fourth (S4) switches.

31 Claims, 4 Drawing Sheets

BUCK-BOOST SWITCHING REGULATOR

BACKGROUND OF THE INVENTION

The invention relates to buck-boost switched voltage regulators (also referred to as buck-boost DC—DC voltage converters), and more particularly to improvements therein which reduce power dissipation, provide smooth transitions between buck mode and boost mode, and provide stable operation during fast switching of the load current.

So-called Cuk and Sepic switching topologies are known for buck-boost voltage regulation, and are described in "Dynamic Analysis of the Switch-Mode DC/DC Converters", by Andre Kislovski et al., Van Nostrand Reinold, New York, pp. 177–203. The Cuk and Sepic topologies include two inductors. This nearly doubles the amount of circuit board area, the cost, and the amount of EMI (electromagnetic interference) produced by the regulator. Another typical prior art buck-boost switching voltage regulator includes two power switches, two diodes (or synchronous rectifiers), one inductor, and a load capacitor. Such typical prior art buck-boost switching voltage regulators are described in U.S. Pat. Nos. 4,395,675, 4,578,630, 5,528,125, 5,734,258 and 5,602,463. These buck-boost topologies typically include two simultaneously switching power transistors and two diodes or synchronous rectifiers operating invert each clock or oscillation cycle. This essentially doubles the power dissipation of the regulator in most of its operating modes.

U.S. Pat. No. 5,734,258 discloses complex inductor coupling arrangements in a buck-boost switching regulator, wherein switching decisions are based on the relationship between the unregulated input voltage and the output voltage. This technique does not allow fast response to rapid changes in the load. Furthermore, the operation of circuitry within the buck-boost switching regulator is unpredictable when the output voltage is nearly equal to the unregulated input voltage. Furthermore, products using complex custom inductor arrangements and transformer arrangements are unsuitable for high-volume production.

Prior buck-boost switched voltage regulators typically use a comparator to determine whether the input voltage or the regulated output voltage is larger, and use that information to control only one of the switches. This approach is often slow because too much "cycling" is required. Furthermore, if the unregulated input voltage goes significantly below the regulated output voltage, that may cause serious circuit stability problems.

Therefore, there is an unmet need for a low-cost, fast-responding integrated circuit buck-boost switching voltage regulator having stable circuit operation despite large differences between the unregulated input voltage and the regulated output voltage.

SUMMARY OF THE INVENTION

Accordingly, it is an object of the invention to provide an economical buck-boost switched voltage regulator having low power dissipation.

It is another object of the invention to provide an economical buck-boost switched voltage regulator that provides smooth transitions between buck mode and boost mode operation.

It is another object of the invention to provide an economical buck-boost switched voltage regulator that provides fast, stable circuit operation despite rapid changes in the load to which the regulated output voltage is applied.

It is another object of the invention to provide an economical buck-boost switched voltage regulator that avoids inaccuracies and/or circuit instability resulting from switching decisions based on use of a comparator to determine which of the unregulated input voltage and the regulated output voltage is greater.

Briefly described, and in accordance with one embodiment thereof, the invention provides a voltage regulator (1) including a first switch (S1) coupled between an input conductor (2) and a first terminal (4) of an inductor (5), a second switch (S2) coupled between the first terminal of the inductor and a common conductor (3), a third switch coupled between an output conductor (7) and a second terminal (6) of the inductor, and a fourth switch (S4) coupled between the second terminal of the inductor and the common conductor (3). A first signal ($V_{32}$) representative of the difference between an output voltage ($V_{OUT}$) is produced on the output conductor (7) by the voltage regulator and a reference voltage. A pulse width modulated signal (PWM) is produced by comparing the first signal to a reference voltage. The first (S1) and fourth (S4) switches are controlled in response to the pulse width modulated signal and first (Q23) and second (Q27) state signals representative of prior states of the first (S1) and fourth (S4) switches. In one embodiment, a signal ($I_{MEAS}$) is produced representative of current through the inductor (5). A signal is produced representing a combination of the first signal and the second signal and is compared to the reference voltage to produce the pulse width modulated signal.

DETAILED DESCRIPTION OF THE PREFERRED EMBODIMENTS

Figure 1:
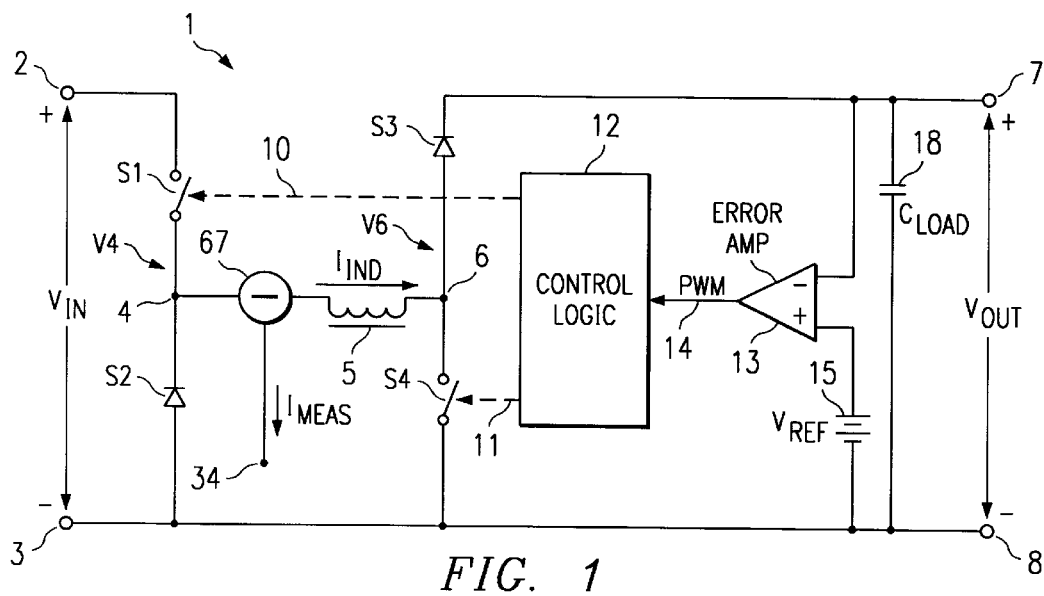
FIG. 1 is a schematic diagram of a buck-boost switching regulator according to the present invention.

Referring to FIG. 1, buck-boost switching regulator 1 has an unregulated input voltage $V_{IN}$ applied between terminals 2 and 3. Terminal 2 is an input terminal connected to one terminal of a switch S1. A second terminal of switch S1 is connected by conductor 4 a first terminal of an inductor 5 and to the anode of a diode or synchronous rectifier S2, the other terminal of which is connected to conductor 3. Conductor 3 serves as a common input/output terminal of buck-boost switching regulator 1. A second terminal of inductor 5 is connected by conductor 6 to a first terminal of a switch S4 and to the anode of a switch or synchronous rectifier S3. A current sensor 67 produces a current measurement signal $I_{MEAS}$ flowing through inductor 5. The second terminal of switch S4 is connected to the common input/output conductor 3. The cathode of diode S3 is connected to an output conductor 7. A load capacitor 18 having a capacitance $C_{LOAD}$ is connected between conductor 7 and conductor 3. Buck-boost switching regulator 1 produces a regulated output voltage $V_{OUT}$ between conductor 7 and conductor 3.

Switch S1 is controlled by a pulse width modulated signal 10 produced by a control logic circuit 12. Switch S4 is controlled by a pulse width modulated signal 11 produced by control logic circuit 12. An error amplifier 13 having a (−) input connected to conductor 7 and a (+) input connected to receive a reference voltage $V_{REF}$ produces an error signal 14 as an input to control logic circuit 12. (As subsequently explained, the error signal on conductor 14 represents the condition of both the output voltage $V_{OUT}$ on conductor 7 and the current $I_{IND}$ through inductor 5.) $V_{REF}$ is produced by a voltage source 15. Control logic circuit 12 adjusts pulse width modulated signals 10 and 11 in accordance with error signal 14. Control logic circuit 12 determines which of switches S1 and S4 have to be switched from an off state to an on state or vice versa during each clock cycle, based on the states of those two switches during the present clock cycle and/or previous clock cycles, and also based on the error amplifier output signal 14 during the present and/or previous clock cycles.

Referring to FIG. 1, to a first approximation, buck-boost switching regulator 1 operates as follows. If $V_{IN}$ is less than $V_{OUT}$, regulator 1 operates mostly in a boost mode or step-up mode. In boost mode, switch S1 is closed. If switch S4 is in its open state, the current $I_{IND}$ in inductor 5 flows through diode S3 into load capacitor 18; $I_{IND}$ decreases in value until logic control circuit 12 determines, on the basis of the values of $V_{OUT}$ and $I_{IND}$, that switch S4 should be closed. Closing switch S4 causes the current $I_{IND}$ through inductor 5 to increase until it attains a value at which control logic circuit 12 determines, on the basis of the present values of $V_{OUT}$ and $I_{IND}$, that switch S4 should be opened again to cause the current in inductor 5 to again flow through diode S3 into load capacitor 18. (The "pure" boost mode is subsequently described in more detail with reference to the timing diagrams of FIGS. 4A and 4B, wherein duty cycles of pulse width modulated signals 10 and 11 are adjusted by control logic circuit 12 in response to a pulse width modulated error signal PWM produced on conductor 14 by error amplifier 13 in accordance with the values of $I_{IND}$ and $V_{OUT}$. This changes the average value of the load current and the current through inductor 5, and hence changes the regulated output voltage $V_{OUT}$.)

Still referring to FIG. 1, if $V_{IN}$ is greater than $V_{OUT}$, then buck-boost switching regulator 1 in operates mostly in a buck or step-down mode, wherein switch S4 is open and switch S1 is opened and closed by control logic circuit 12 as necessary to maintain $V_{OUT}$ in regulation. ("Pure" buck mode or step-down operation is described in more detail with reference to FIGS. 3A and 3B.)

As subsequently explained in more detail with reference to FIG. 5, the preferred embodiments of the buck-boost switching regulator 1 of the present invention actually operate continually in a "mixed mode" in which smooth transitions are achieved between conditions wherein $V_{OUT}$ substantially exceeds or is less than $V_{IN}$ and/or wherein there are sudden large changes in the output current supplied to load capacitor 18.

Figure 2:
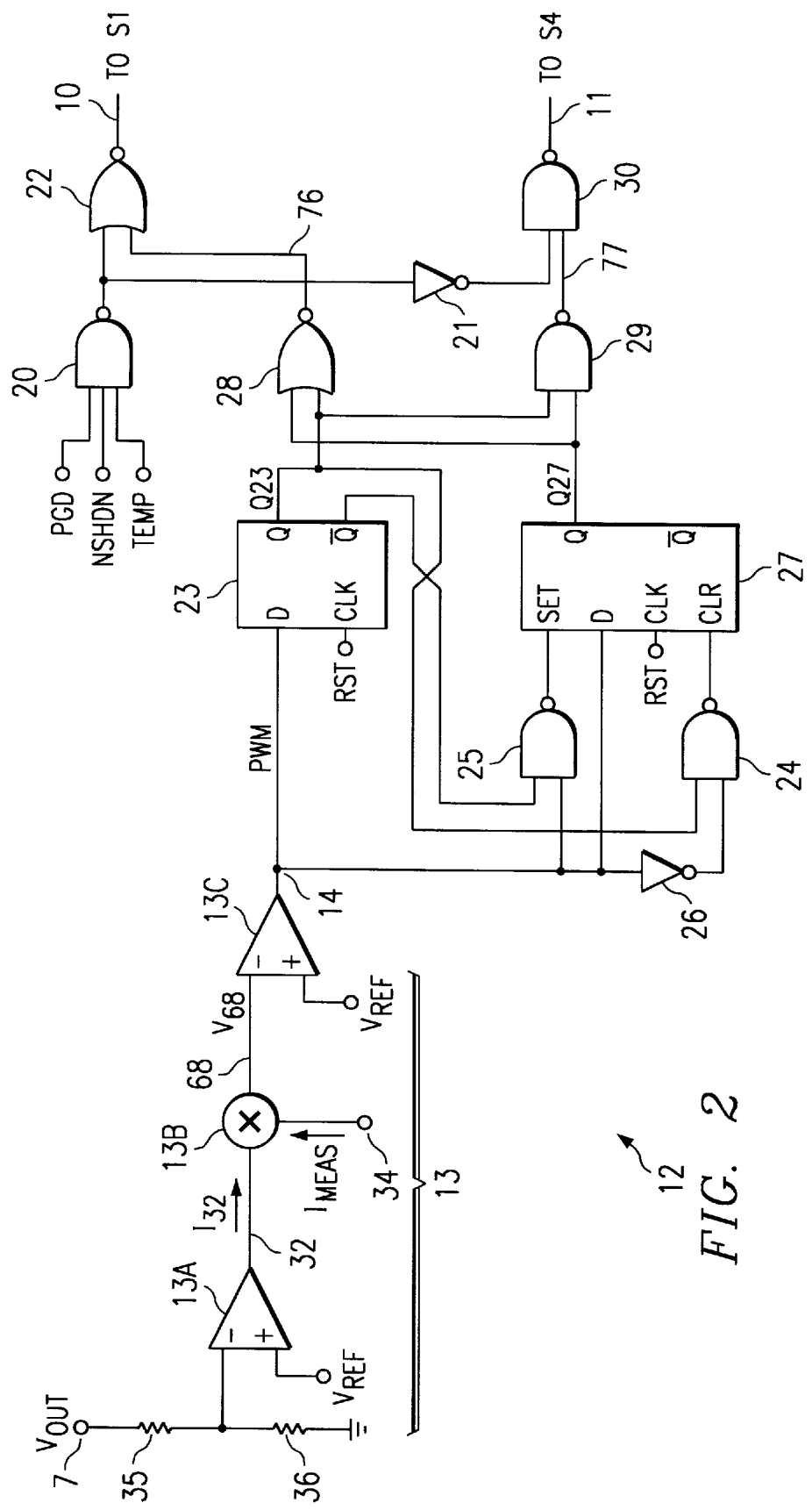
FIG. 2 is a block diagram of the control logic 12 in FIG. 1.

The logic diagram of control logic circuit 12 is shown in FIG. 2, and includes a NAND gate 20 having a first input connected to receive a signal PGD, a second input connected to receive a signal NSHDN, and a third input connected to receive a signal TEMP from a temperature compensation circuit. The signal PGD is a "power good" signal generated by an internal supply voltage generating circuit to indicate when the internal supply voltage is at an adequate level. The signal NSHDN is a "shutdown" signal produced by shutdown circuitry (not shown) which causes the buck-boost regulator 1 to be in a shut down condition in which switch S1 is open and switch S4 is closed if there is an overtemperature condition, and if the internal power supply is being powered up to 4.5 V during start-up.

The output of NAND gate 20 is connected to the input of an inverter 21 and to one input of a two input NOR gate 22. The output of inverter 21 is connected to one input of a two input NAND gate 30. The error signal PWM is applied to the D input of a D type flip-flop 23, to one input of a two input NAND gate 25, to the D input of a D type flip-flop 27, and to the input of an inverter 26. The information stored in flip-flops 23 and 27 is encoded to represent the most recent states of switches S1 and S4.

Still referring to FIG. 2, error amplifier circuit 13 includes a differential transconductance amplifier 13A having its (−) input coupled to the junction between resistors 35 and 36 of a resistive voltage divider circuit. Resistors 35 and 36 are connected in series between $V_{OUT}$ and ground. The (+) input of transconductance amplifier 13A is connected to $V_{REF}$. Transconductance amplifier 13A provides a current output $I_{32}$ that is conducted by conductor 32 to an input of a current summing circuit 13B which also receives a measurement current $I_{MEAS}$ through conductor 34. Preferably, current summing circuit 13B is simply a conductor 68, to which conductor 34 is connected. The measurement current $I_{MEAS}$ is representative of the current $I_{IND}$ through inductor 5, and is produced by a suitable current sensor 67. Various current sensor devices could be used, preferably the one described in my commonly assigned pending patent application "METHOD AND CIRCUITS FOR INDUCTOR CURRENT MEASUREMENT IN MOS SWITCHING REGULATORS", Docket No. 0437-A-232, Ser. No. 09/733,282, filed Dec. 8, 2000, and incorporated herein by reference.

Current summing circuit 13B provides a voltage output $V_{68}$ on conductor 68, which is connected to the (−) input of a comparator 13C that generates the error signal PWM on conductor 14. The (+) input of comparator 13C is connected to $V_{REF}$. Error amplifier circuit 13 determines whether the combination of the present current $I_{IND}$ in inductor 5 and the value of the output voltage $V_{OUT}$ are such that the current through inductor 5 should be increased or decreased. The control logic circuitry 12 shown in FIG. 2 uses that information and also the encoded information stored in flip-flops 23 and 27 regarding the most recent states of switches S1 and S4 to determine if the states of switches S1 and S4 should be changed.

A clock input of flip-flop 23 is connected to receive a clock signal RST. Flip-flop 23 has a $\overline{Q}$ output connected to a second input of NAND gate 25. The output of NAND gate 25 is connected to a "set" input of flip-flop 27. A clock input of flip-flop 27 is connected to receive the clock signal RST. The Q output Q23 of flip-flop 23 is connected to one input of a two-input NAND gate 24 having another input connected to the output of inverter 26. Q23 also is connected to one input of NAND gate 29 and to one input of NOR gate 28. The output of NAND gate 24 is connected to a "clear" input of flip-flop 27. A Q output of flip-flop 27 is connected to one input of a two-input NOR gate 28 and to one input of a two-input NAND gate 29. NOR gate 28 and NAND gate 29 function to decode the encoded states in flip-flops 23 and 27 to determine the states of switches S1 and S4. The output 76 of NOR gate 28 is connected to a second input of NOR gate 22. The output 77 of NAND gate 29 is connected to a second input of NAND gate 30. The pulse width modulated signal 10 that controls switch S1 and the pulse width modulated signal 11 that controls switch S4 are produced on the outputs of NOR gate 22 and NAND gate 30, respectively.

Figure 3A:
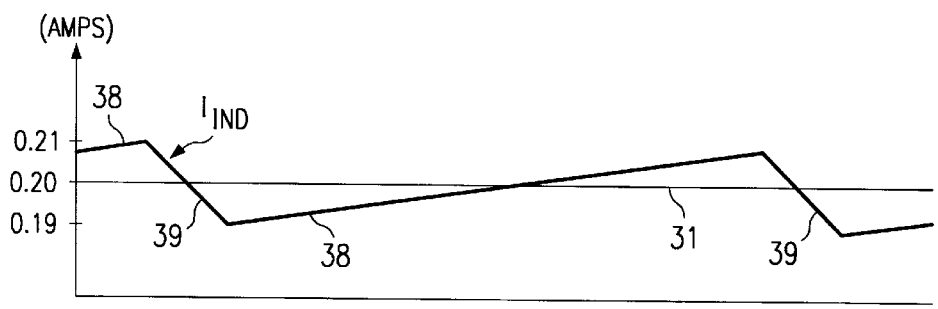
FIGS. 3A and 3B are timing diagrams and which illustrate operation of the buck-boost switching voltage regulator of FIG. 1 in its buck (step-down) operation mode.
Figure 3B:
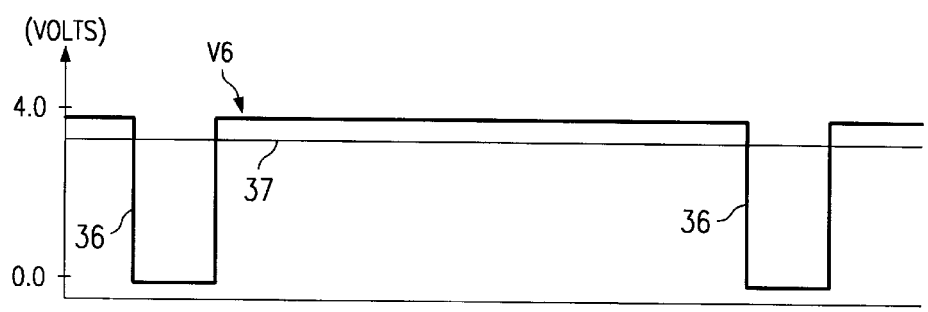

FIGS. 3A and 3B are useful in further describing buck operation, i.e., step-down operation, of buck-boost switching regulator 1 when $V_{IN}$ is greater than $V_{OUT}$. In FIG. 3A, the waveform $I_{IND}$ represents the current through inductor 5 during buck operation, and numeral 31 indicates the average current through inductor 5 during buck operation. During segment 38 of the $I_{IND}$ waveform, switch S1 is closed, diode S2 is off, switch S4 is open, and diode S3 is on, so current flows directly from $V_{IN}$ through switch S1, inductor 5, and diode S3 2 $V_{OUT}$. This causes the inductor current $I_{IND}$ to increase and maintained a voltage V6 on conductor 6 in FIG. 1 at a steady level.

If control logic circuit 12 closes switch S4 and opens switch S1, the voltage V6 falls to zero, as indicated by numeral 36. Diode S3 then is off, and the current $I_{IND}$ in inductor 5 circulates through conductor 3, diode S2, switch S4, and back into conductor 3, as shown. Under these conditions, the inductor current $I_{IND}$ decreases as indicated in segment 39 of the curve $I_{IND}$. The current $I_{IND}$ thus increases and decreases so as to regulate $V_{OUT}$ in the buck mode in accordance with how error amplifier circuitry 13 and a control logic circuitry 12 shown in FIG. 2 "interpret" $V_{IN}$, $V_{OUT}$, and $I_{IND}$.

Figure 4A:
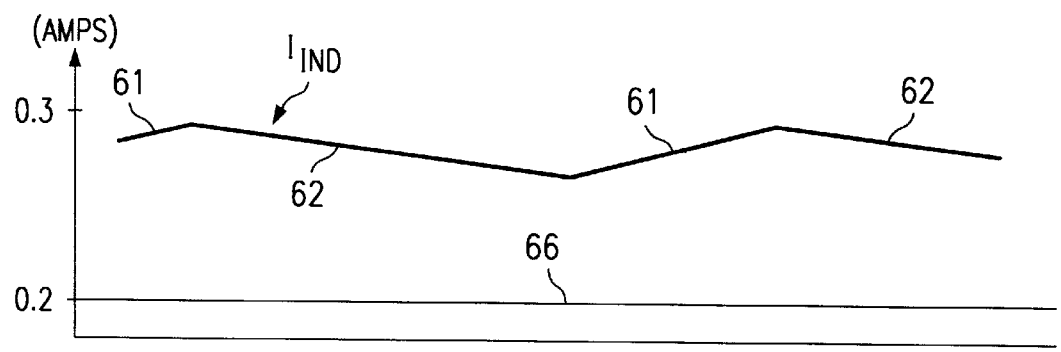
FIGS. 4A and 4B are timing diagrams which illustrate operation of the buck-boost switching voltage regulator of FIG. 1 in its boost (step-up) operation mode.
Figure 4B:
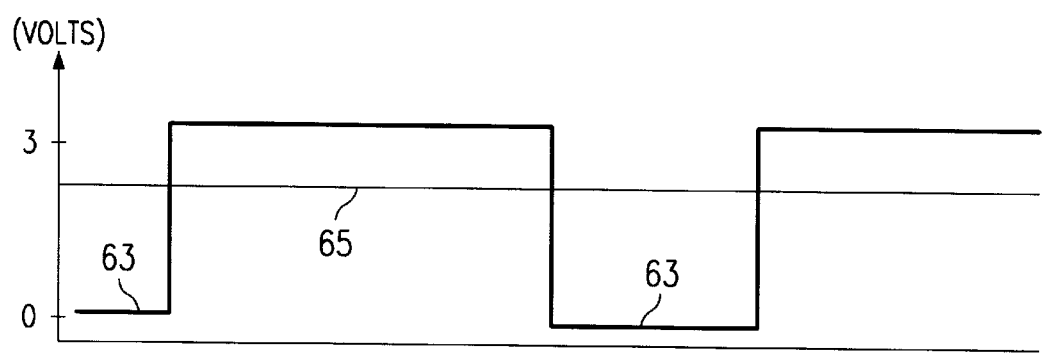

FIGS. 4A and 4B are useful in further describing the operation of buck-boost switching regulator 1 during boost mode, when $V_{IN}$ is less than $V_{OUT}$. During segments 61 of the $I_{IND}$ waveform in FIG. 4A, switches S1 and S4 both are closed, and V6 is at zero volts as indicated by numeral 63. The inductor current $I_{IND}$ flows from $V_{IN}$ through closed switches S1 and S4 to common conductor 3. This causes the inductor current $I_{IND}$ to increase as indicated by the slope of segment 61 of the $I_{IND}$ waveform in FIG. 4A.

If error amplifier 13 and control logic circuitry 12 then determine that the inductor current $I_{IND}$ should be decreasing, control logic circuitry 12 then causes switches S1 and S4 to be open. Diodes S2 and S3 then are on, and the inductor current $I_{IND}$ decreases, as indicated by segment 62 of the $I_{IND}$ waveform. If error amplifier circuit 13 and control logic circuit 12 determine that the load current needs to increase, switch S1 is closed, so the inductor current is supplied from $V_{IN}$ on conductor 2 rather than from common conductor 3. Thus, $I_{IND}$ increases and decreases so as to regulate the output voltage $V_{OUT}$ and to produce an average load current value 66 (which in boost mode is substantially less than the average inductor current).

As mentioned above, buck-boost regulator 1 usually does not operate in the above described "pure" buck mode or the "pure" burst mode. Instead, the preferred embodiment of the buck-boost switching regulator 1 of the present invention operates in a "mostly buck" mode, a "mostly boost" mode, or a "mixed mode" in which smooth transitions are achieved between conditions in which $V_{OUT}$ substantially exceeds or is substantially less than $V_{IN}$ and/or in which there are sharp changes in the output current supplied to load capacitor 18.

It should be understood that one way of operating switches S1 and S4 of buck-boost regulator 1 would be to operate them simultaneously. Since the MOS transistors used as switches S1 and S4 are physically large devices, their gate-to-source and gate-to-drain capacitances are very large. Consequently, when switches S1 and S4 are switched on or off, the switching power dissipation losses are large. It would be very desirable to reduce the switching power losses by changing the states of switches S1 and S4 only when necessary to provide the needed level of regulation of $V_{OUT}$.

According to the present invention, information representative of the most recent states of the switches S1 and S4 is stored in the flip-flops in FIG. 2 and utilized in conjunction with both voltage feedback and current feedback to provide faster, more stable voltage regulation and to allow operation of the switches so as to substantially reduce power dissipation. Referring to FIGS. 1 and 2, in every clock cycle, buck-boost switching regulator 1 uses prior switch state information and both voltage and current feedback. The voltage feedback is through the path from $V_{OUT}$ through the resistive voltage divider including resistors 35 and 36, through transconductance amplifier 13A, current summing circuit 13B, comparator 13C and control logic circuit 12 of FIG. 2 to switches S1 and S4. The current feedback is provided by means of above mentioned current sensor 67 (FIG. 1) to current summing circuit 13B. Current summing circuit 13B sums a current output produced by transconductance amplifier 13A with the measurement current $I_{MEAS}$.

The topology of buck-boost switching regulator 1 allows use of a more complex "mixed mode" switching algorithm, shown in subsequently described FIG. 6, that results in flawless transitions between the buck mode and boost mode. For example, during fast switching of the load current, the mixed-mode operation described with reference to FIG. 5 can be provided. To realize the mixed-mode operation, control logic circuit 12 operates according to the following algorithm:

(1) No more than a total of two changes of the states of switches S1 and S4 can occur during a clock cycle.

(2) If the error signal PWM was on (i.e., at a high level) at the beginning of the present clock cycle and it did not change state during the previous clock cycle, then switch S4 is turned on at the beginning of the next clock cycle and then S4 is turned off in response into a subsequent change of state of the error signal 14. That is, the logic circuitry 12 can skip a few pulses.

(3) If during the present clock cycle the error signal PWM goes from an on (high) state to an off (low) state, and if both switches S1 and S4 were in their on state, then switch S4 switches to its off state. Switch S1 is turned off only if switch S4 was in its off state during the previous clock cycle.

(4) If at the beginning of the previous clock cycle the error signal PWM was at an off state, then switch S1 switches to its off state; switch S4 is already in its off condition during the previous clock cycle. Switch S1 then switches to its on state when PWM changes state; that is, the logic circuitry 12 can skip a few pulses under a light loading condition.

(5) During a shutdown condition, an overtemperature condition, and while the internal power supply voltage reaches 4.5 volts during start-up, control logic circuit 12 keeps switch S1 in its off condition and keeps switch S4 in its on condition.

Figure 5:
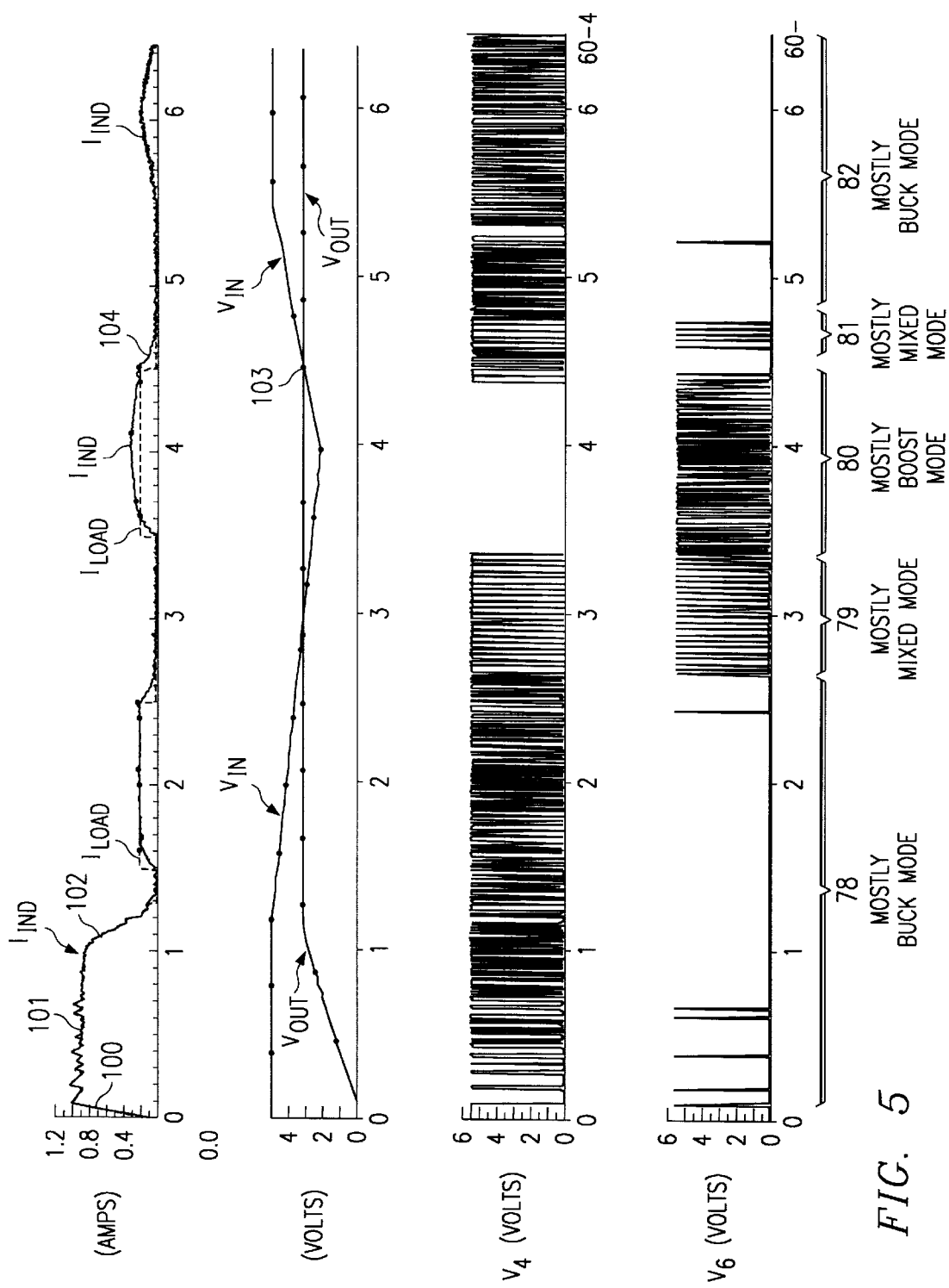
FIG. 5 is a timing diagram including waveforms that illustrate smooth transitions between buck mode and boost mode, with power saving pulse skipping under light load conditions and under conditions wherein the regulated output voltage is nearly equal to the unregulated input voltage.

Referring to FIG. 5, the unregulated input voltage $V_{IN}$ might be 5 volts, and $V_{OUT}$ might, for example, be zero. Then it is necessary for inductor 5 to provide as much current as practical in order to charge load capacitor 18 up toward the regulated value of $V_{OUT}$ as fast as possible, as indicated by numeral 100 in FIG. 5. Control logic circuit 12 closes switch S4, and current flows from input conductor 2 through switch S1 and inductor 5 through closed switch S4. The inductor current $I_{IND}$ rapidly accelerates to the maximum level indicated by numeral 101 in FIG. 5. Then control logic circuit 12 opens switch S4. This steers the maximum level 101 of the inductor current $I_{IND}$ through diode S3 into load capacitor 18. The foregoing process provides the fastest possible acceleration of the inductor current when it is most needed. Switch S4 then is switched on and off by control logic 12 only as necessary to keep the current delivered to load capacitor 18 close to a suitable average level that maintains $V_{OUT}$ in regulation.

In accordance with the present invention, if $V_{OUT}$ is below its desired regulation value, the algorithm (shown in FIG. 6) performed by control logic circuit 12 recognizes that $I_{IND}$ must be increased, and makes the determination of when to increase $I_{IND}$ on the basis of the encoded states Q23 and Q27 of flip-flops 23 and 27, rather than on the basis of the prior art technique of using a comparator which compares $V_{OUT}$ and $V_{IN}$.

Figure 6:
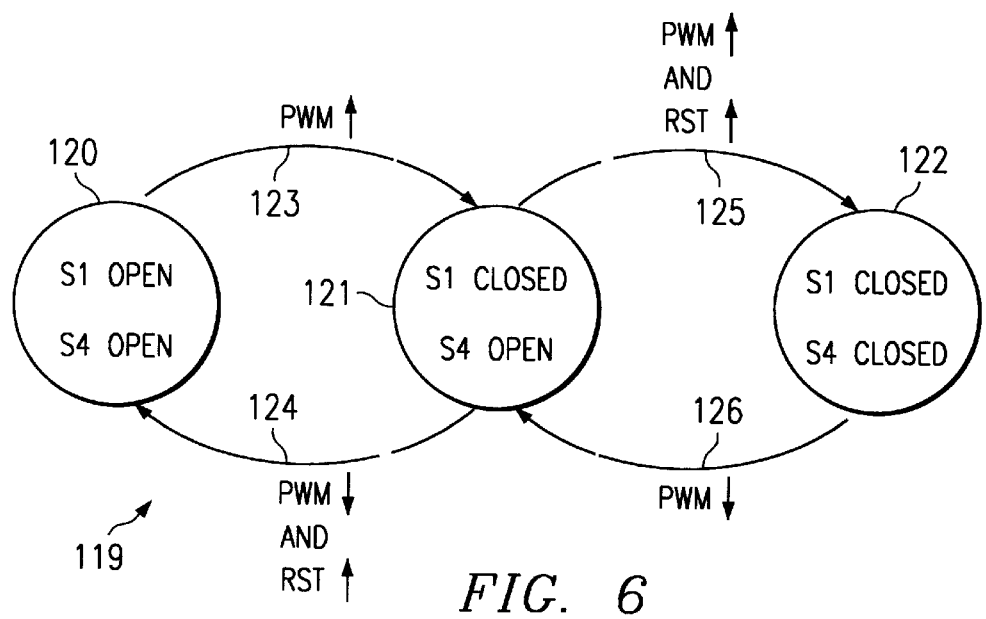
FIG. 6 is a flowchart illustrating the basic algorithm performed by the logic control circuit 12 of FIGS. 1 and 2 in order to produce the control signals needed to operate switches S1 and S4 in response to the values of $V_{OUT}$, $I_{IND}$, and the previous states of switches S1 and S4.

If the prior state of switch S1 was closed, and if the inductor current $I_{IND}$ is small, then the algorithm of FIG. 6 closes switch S4. This causes the inductor current $I_{IND}$ to increase. However, if the prior state of switch S1 was open, then the algorithm might just close switch S1 rather than closing switch S4, because that may produce a sufficient increase in the value of $I_{IND}$. If during the next cycle control logic circuit 12 determines that the magnitude of $I_{IND}$ is insufficient, then it will close both switches S1 and S4 to maximize the acceleration of the value of $I_{IND}$. If the value of $I_{IND}$ is already sufficient, then control logic circuit 12 opens switch S1 and waits for the next cycle.

If $V_{OUT}$ is too low, then it is necessary for control logic circuit 12 to somehow increase $I_{IND}$ at the beginning of the next cycle. But without the previous states of S1 and S2 stored in flip-flops 23 and 27, respectively, control logic circuit 12 has no way of knowing whether it should close switch S1 or switch S4.

If $V_{OUT}$ is too high, then control logic circuit 12 has to decrease $I_{IND}$ at the beginning of the next cycle, either by opening switches S1 and S4, or, if both of them were previously in their closed state, then control logic circuit 12 can make the decision to keep switches S1 and S4 off for a few cycles, which is referred to herein as "pulse skipping".

Referring again to FIG. 5, the $I_{LOAD}$ curve in the top graph of FIG. 5 shows a rapidly changing load current waveform 70 and the resulting corresponding waveform of the current $I_{IND}$ produced in inductor 5. The $I_{IND}$ curve of FIG. 5 shows a hypothetical load current variation. A hypothetical input voltage curve shows the unregulated input voltage $V_{IN}$ (second graph in FIG. 5) starting at +5 volts and then undergoing a gradual decrease, followed by a gradual increase back up to +5 volts. The resulting regulated output voltage curve of $V_{OUT}$ is illustrated as starting at zero volts and increasing fairly rapidly up to a steady regulated value of approximately 3 volts. The V4 curve represents the voltage on conductor 4 in FIG. 1, and the V6 curve represents the voltage on conductor 6 in FIG. 1, so V4 represents the voltage across switch S1, and V6 represents the voltage across switch S4.

The rapidly rising segment 100 of the $I_{IN}$ curve in FIG. 5 occurs when switches S1 and S4 are closed, as described in one of the above examples, to provide the most rapid possible acceleration of the inductor current to charge load capacitor 18 up to the desired regulated value of $V_{OUT}$ as rapidly as possible. When $V_{OUT}$ reaches its regulated value of approximately 3 volts, then the inductor current $I_{IND}$ falls off rapidly, as indicated by numeral 102 in FIG. 5. In the example illustrated in FIG. 5, $V_{IN}$ gradually decreases until it is equal to $V_{OUT}$. Note that regulator 1 operates mostly in buck mode until $V_{IN}$ reaches the point indicated by numeral 78 in FIG. 5. As $V_{IN}$ decreases below the regulated value of $V_{OUT}$, regulator 1 operates in a mostly mixed mode, as indicated by numeral 79, until the load current $I_{LOAD}$ undergoes a sudden increase. As indicated by numeral 80, regulator 1 then operates mostly in a boost mode, until $V_{IN}$ increases to the point at which $V_{IN}$ is equal to the regulated value of $V_{OUT}$. When $I_{LOAD}$ then suddenly decreases as indicated by numeral 104, regulator 1 then operates in a mostly mixed mode for a short duration indicated by numeral 81. From then on, as V increases further, regulator 1 operates mostly in buck mode, as indicated by numeral 82.

FIG. 6 shows a flow diagram of a state diagram 119 representing the algorithm executed by logic control circuit 12 in response to the measured values of $V_{OUT}$, $I_{MEAS}$ (which represents $I_{IND}$) Q23, and Q27. State diagram 119 includes three of the four possible combinations of states of switches S1 and S4, the fourth state being a "forbidden state" in which switch S1 is open and switch S4 is closed. As can be recognized by review of the above described circuitry, the particular state of FIG. 6 in which corresponds to the state of regulator 1 is determined by the present states of flip-flops 23 and 27 which are decoded to control switches S1 and S4, and by the error signal PWM produced on conductor 14 by comparator 13C in response to the present values of $V_{OUT}$ and $I_{IND}$. The state 120 corresponds to switches S1 and S4 both being open, wherein the inductor current $I_{IND}$ flows from conductor 3 through diode or synchronous switch S2, inductor 5, and synchronous switch or diode S3 into the upper plate of load capacitor 18. State 120 occurs when a logical "0" is stored in both of flip-flops 23 and 27 of FIG. 2 and is decoded by NOR gate 28 and NAND gate 29. This state results in a "buck mode discharge" which decreases the inductor current $I_{IND}$.

The state 121 of state diagram 119 corresponds to switch S1 being closed and switch S4 being open, wherein the charging current flows from conductor 2 through switch S1, inductor 5, and diode S3 into the upper plate of load capacitor 18. State of 121 occurs when a "0" stored in flip-flop 23 and a "1" stored in flip-flops 27 are decoded. This state results in a "buck mode charging" of the output load.

The state 122 of state diagram 119 corresponds to switches S1 and S4 both being closed, wherein current flows from conductor 2 through closed switch S1, inductor 5 and closed switch S4 to conductor 3 in order to increase the inductor current $I_{IND}$ to a maximum value as rapidly as possible. This state 122 occurs when a "1" stored in each of flip-flops 23 and 27 is decoded, and results in a "boost mode" charging of the inductor current.

When buck-boost regulator 1 is in state 120, and the pulse width modulated error signal PWM produced on conductor 14 by comparator 13C of FIG. 2 undergoes a transition from a low level to a high level (as indicated by the upward-pointing arrow), then control logic circuit 12 operates to immediately close switch S1, causing control logic circuit 12 to establish state 121 of state diagram 119, thereby causing the charging current flowing into the upper plate of load capacitor 18 to be supplied from (+) input conductor 2 instead of (−) conductor 3. This causes the inductor current $I_{IND}$ and hence the load charging current to gradually increase. When buck-boost regulator 1 is in state 121 and the pulse width modulated error signal PWM undergoes a transition from a low level to a high level, and the leading edge of the next clock cycle pulse occurs, as indicated by path 125 in FIG. 6, then control logic circuit 12 establishes state 122 of state diagram 119 by closing switch S4, causing the inductor current $I_{IND}$ to rapidly increase to a maximum value. However, if during state 121 the error signal PWM undergoes a transition from a high level (as indicated by the downward-pointing arrow) to a low level and then the leading edge of the next clock cycle pulse occurs, then control logic circuit 12 re-establishes state 120 by opening switch S1, as indicated by path 124. If regulator 1 is in state 122 of state diagram 119 and the error signal PWM undergoes a transition from a high-level to a low-level, then control logic circuit 12 immediately re-establishes the state 121 by opening switch S4 as indicated by path 126.

The mixed mode operation accomplished by control logic 12 by implementing the state diagram 119 of FIG. 6 allows a smooth transition between buck mode operation and boost load operation, with power saving pulse skipping being used under light loading conditions and when the values of $V_{IN}$ and $V_{OUT}$ are nearly equal to each other. $V_{OUT}$ is stable when $V_{IN}$ goes above and below $V_{OUT}$ during load current changes.

The buck-boost switching regulator 1 overcomes the shortcomings of the above described prior art buck-boost regulators by causing only half of the switches to change state during each operation cycle, and thereby substantially decreases the amount of power dissipation compared to the prior art.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, the basic invention does not require use of a current sensor 67 to measure the current inductor 5. The output of amplifier 13A can be connected directly to the (−) input of comparator 13C, without use of current summing circuit 13B; in this case a triangle waveform could be used as the reference voltage applied to the (+) input of comparator 13C, although $V_{REF}$ could be used as shown. (The use of $I_{MEAS}$ as previously described provides improved frequency stability, but is not essential to all embodiments of the invention.) As another example, in an "alternative boost mode", which would correspond to the above mentioned "forbidden" state of the state diagram of FIG. 6 in which switch S1 is open and switch S4 is closed. If switch S1 is closed and switch S4 is open at the beginning of the clock cycle, $V_{IN}$ supplies the current $I_{IND}$ into inductor 5 and through diode S3 into load capacitor 18, so $I_{IND}$ increases until control logic 12 opens switch S1 and closes switch S4. This causes the inductor current $I_{IND}$ to flow through switch S4, so $I_{IND}$ recirculates in a loop including inductor 5, switch S4, common conductor 3, and diode S2. This prevents further inductor current from flowing into load capacitor 18, and continues until control logic 12 opens switch S4 to direct the current in inductor 5 through diode S3 into load capacitor 18. This "forbidden" mode of operation has the disadvantage of dissipating a considerable amount of power, but nevertheless is within the scope of the present invention.

What is claimed is:

1. A method of operating a voltage regulator including a first switch coupled between an input conductor and a first terminal of an inductor, a second switch coupled between the first terminal of the inductor and a common conductor, a third switch coupled between an output conductor and a second terminal of the inductor, and a fourth switch coupled between the second terminal of the inductor and the common conductor, an unregulated input voltage being applied between the input conductor and the common conductor, the method comprising:

(a) producing a first signal representative of a difference between an output voltage produced on the output conductor by the voltage regulator and a first voltage;

(b) producing a second signal by comparing the first signal to a second voltage; and (c) controlling the first and fourth switches in response to the second signal and first and second state signals representative of prior states of the first and fourth switches.

2. A method of operating a voltage regulator including a first switch coupled between an input conductor and a first terminal of an inductor, a second switch coupled between the first terminal of the inductor and a common conductor, a third switch coupled between an output conductor and a second terminal of the inductor, and a fourth switch coupled between the second terminal of the inductor and the common conductor, an unregulated input voltage being applied between the input conductor and the common conductor, the method comprising:

(a) producing a first signal representative of a difference between an output voltage produced on the output conductor by the voltage regulator and a first reference voltage, and producing a second signal representative of current through the inductor, and producing a third signal representing a combination of the first signal and the second signal;

(b) producing a fourth signal by comparing the third signal to a second reference voltage; and (c) controlling the first and fourth switches in response to the fourth signal and first and second state signals representative of prior states of the first and fourth switches.

3. The method of claim 2 wherein the first and second reference voltages are the same reference voltage.

4. The method of claim 3 including producing the first signal by means of a resistive voltage divider coupled between the output conductor and the common conductor and a differential amplifier circuit having a first input coupled to an output of the resistive voltage divider and a second input coupled to the reference voltage.

5. The method of claim 4 including producing the first signal as a first current signal, and producing the third signal by summing the first current signal and the second signal and producing the third signal as a voltage signal.

6. The method of claim 2 including producing the fourth signal as a pulse width modulated signal representative of the output voltage and the current through the inductor.

7. The method of claim 2 including storing the first state signal in a first flip-flop and storing the second state signal in a second flip-flop.

8. The method of claim 2 wherein step (c) includes determining from the first state signal and the second state signal that the first switch and the fourth switch are open, maintaining both the first switch and the fourth switch open, and then, if the fourth signal undergoes a transition from a first level to a second level, closing the first switch to gradually increase an amount of current flowing through the inductor and the third switch into the output conductor.

9. The method of claim 8 wherein the determining includes decoding the first state signal and the second state.

10. The method of claim 8 including determining from the first state signal and the second state signal that the first switch is closed and the fourth switch is open, and if the fourth signal undergoes a transition from the second level to the first level and a clock signal then undergoes a transition indicating the beginning of a next clock cycle, then opening the first switch to gradually decrease the amount of current flowing through the inductor and the third switch into the output conductor.

11. The method of claim 8 including determining from the first state signal and the second state signal that the first switch is closed and the fourth switch is open, and if the fourth signal undergoes a transition from the first level to the second level and a clock signal then undergoes a transition indicating the beginning of a next clock cycle, then closing the fourth switch to rapidly increase the amount of current flowing through the inductor.

12. The method of claim 10 including determining from the first state signal and the second state signal that the first switch is closed and the fourth switch is open, and if the fourth signal undergoes a transition from the first level to the second level and the clock signal then undergoes a transition indicating the beginning of a next clock cycle, then closing the fourth switch to rapidly increase an amount of current flowing through the inductor.

13. The method of claim 12 including determining from the first state signal and the second state signal that both the first switch and the fourth switch are closed, and if the fourth signal undergoes a transition from the second level to the first level and the clock signal then undergoes a transition indicating the beginning of a next clock cycle, then opening the fourth switch to cause the rapidly increased amount of current flowing through the inductor to flow through the third switch into the output conductor.

14. The method of claim 11 including determining from the first state signal and the second state signal that both the first switch and the fourth switch are closed, and if the fourth signal undergoes a transition from the second level to the first level and the clock signal then undergoes a transition indicating the beginning of a next clock cycle, then opening the fourth switch to cause the rapidly increased amount of current flowing through the inductor to flow through the third switch into the output conductor.

15. A voltage regulator comprising:
(a) a first switch coupled between an input conductor and a first terminal of an inductor, a second switch coupled between the first terminal of the inductor and a common conductor, a third switch coupled between an output conductor and a second terminal of the inductor, and a fourth switch coupled between the second terminal of the inductor and the common conductor, an unregulated input voltage being applied between the input conductor and the common conductor;
(b) error amplifier circuitry configured to produce a first signal representative of the difference between an output voltage produced on the output conductor by the voltage regulator and a first voltage;
(c) a comparator having a first input coupled to receive the first signal and a second input coupled to receive a second voltage and configured to produce a second signal by comparing the first signal to the second voltage; and
(d) logic circuitry configured to control the first and fourth switches in response to the fourth signal and first and second state signals representative of prior states of the first and fourth switches.

16. A voltage regulator comprising:
(a) a first switch coupled between an input conductor and a first terminal of an inductor, a second switch coupled between the first terminal of the inductor and a common conductor, a third switch coupled between an output conductor and a second terminal of the inductor, and a fourth switch coupled between the second terminal of the inductor and the common conductor, an unregulated input voltage being applied between the input conductor and the common conductor;
(b) error amplifier circuitry configured to produce a first signal representative of the difference between an output voltage produced on the output conductor by the voltage regulator and a first reference voltage;
(c) a current sensor coupled to one of the first and second terminals of the inductor and adapted to produce a second signal representative of current through the inductor;
(d) summing circuitry coupled to an output of the current sensor and an output of the error amplifier circuitry and configured to produce a third signal representing the sum of the first signal and the second signal;
(e) a comparator having a first input coupled to receive the third signal and a second input coupled to receive a second reference voltage and configured to produce a fourth signal by comparing the third signal to the second reference voltage; and
(f) logic circuitry configured to control the first and fourth switches in response to the fourth signal and first and second state signals representative of prior states of the first and fourth switches.

17. The voltage regulator of claim 16 wherein the first and second reference voltages are the same reference voltage.

18. The voltage regulator of claim 16 wherein the error amplifier circuitry includes a transconductance amplifier.

19. The voltage regulator of claim 16 including feedback circuitry coupled between the output conductor and a first input of the error amplifier circuitry producing the first signal, the feedback circuitry including a resistive voltage divider coupled between the output conductor and the common conductor, the error amplifier circuitry having a second input coupled to the first reference voltage.

20. The voltage regulator of claim 19 including a current sensor coupled to one of the first and second terminals of the inductor and adapted to produce the second signal as a current representative of the current through the inductor, wherein the error amplifier circuitry produces the first signal as a first current signal, and including the summing circuit as a summing conductor to produce the third signal by summing the first current signal and the second signal and producing the third signal as a voltage signal on the summing conductor.

21. The voltage regulator of claim 16 wherein the comparator is adapted to produce the fourth signal as a pulse width modulated signal representative of the output voltage and the current through the inductor.

22. The voltage regulator of claim 16 including a first flip-flop for storing the first state signal and a second flip-flop for storing the second state signal.

23. The voltage regulator of claim 22 wherein the logic circuitry determines from the first state signal and the second state signal that the first switch and the fourth switch are open, maintains both the first switch and the fourth switch open, and then, if the fourth signal undergoes a transition from a first level to a second level, closes the first switch to gradually increase an amount of current flowing through the inductor and the third switch into the output conductor.

24. The voltage regulator of claim 23 wherein the logic circuitry determines from the first state signal and the second state signal that the first switch is closed and the fourth switch is open, and if the fourth signal undergoes a transition from the second level to the first level and a clock signal then undergoes a transition indicating the beginning of a next clock cycle, then opening the first switch to gradually decrease the amount of current flowing through the inductor and the third switch into the output conductor.

25. The voltage regulator of claim 24 wherein the logic circuitry determines from the first state signal and the second state signal that the first switch is closed and the fourth switch is open, and if the fourth signal undergoes a transition from the first level to the second level and the clock signal then undergoes a transition indicating the beginning of a next clock cycle, then closing the fourth switch to rapidly increase an amount of current flowing through the inductor.

26. The voltage regulator of claim 25 wherein the logic circuitry determines from the first state signal and the second state signal that both the first switch and the fourth switch are closed, and if the fourth signal undergoes a transition from the second level to the first level and the clock signal then undergoes a transition indicating the beginning of a next clock cycle, then opening the fourth switch to cause the rapidly increased amount of current flowing through the inductor to flow through the third switch into the output conductor.

27. A voltage regulator comprising:
   (a) a first switch coupled between an input conductor and a first terminal of an inductor, a second switch coupled between the first terminal of the inductor and a common conductor, a third switch coupled between an output conductor and a second terminal of the inductor, and a fourth switch coupled between the second terminal of the inductor and the common conductor, an unregulated input voltage being applied between the input conductor and the common conductor;
   (b) means for producing a first signal representative of a difference between an output voltage produced on the output conductor by the voltage regulator and a first reference voltage;
   (c) means for producing a second signal representative of current through the inductor, and producing a third signal representing a combination of the first signal and the second signal;
   (d) means for producing a fourth signal by comparing the third signal to a second reference voltage; and
   (e) means for controlling the first and fourth switches in response to the fourth signal and first and second state signals representative of prior states of the first and fourth switches.

28. The voltage regulator of claim 27 wherein the controlling means includes means for determining from the first state signal and the second state signal that the first switch and the fourth switch are open, maintaining both the first switch and the fourth switch open, and then, if the fourth signal undergoes a transition from a first level to a second level, closing the first switch to gradually increase an amount of current flowing through the inductor and the third switch into the output conductor.

29. The voltage regulator of claim 28 wherein the controlling means includes means for determining from the first state signal and the second state signal that the first switch is closed and the fourth switch is open, and if the fourth signal undergoes a transition from the second level to the first level and a clock signal then undergoes a transition indicating the beginning of a next clock cycle, then opening the first switch to gradually decrease the amount of current flowing through the inductor and the third switch into the output conductor.

30. The voltage regulator of claim 29 wherein the controlling means includes means for determining from the first state signal and the second state signal that the first switch is closed and the fourth switch is open, and if the fourth signal undergoes a transition from the first level to the second level and the clock signal then undergoes a transition indicating the beginning of a next clock cycle, then closing the fourth switch to rapidly increase an amount of current flowing through the inductor.

31. The voltage regulator of claim 30 wherein the controlling means includes means for determining from the first state signal and the second state signal that both the first switch and the fourth switch are closed, and if the fourth signal undergoes a transition from the second level to the first level and the clock signal then undergoes a transition indicating the beginning of a next clock cycle, then opening the fourth switch to cause the rapidly increased amount of current flowing through the inductor to flow through the third switch into the output conductor.

* * * * *